United States Patent [19]

Funk et al.

[11] 4,322,184
[45] Mar. 30, 1982

[54] APPARATUS FOR CONTINUOUSLY FEEDING SOLID PARTICLES INTO A PRESSURIZED CONTAINER HAVING AN IMPROVED LIFTING MECHANISM

[75] Inventors: Erwin D. Funk; Mark D. Barrett, both of Glens Falls, N.Y.

[73] Assignee: Kamyr, Inc., Glens Falls, N.Y.

[21] Appl. No.: 100,381

[22] Filed: Dec. 5, 1979

[51] Int. Cl.³ .................. B65G 53/30; C10J 3/30
[52] U.S. Cl. ...................... 406/82; 210/160; 414/217
[58] Field of Search ............ 210/159, 160, 161, 297, 210/400; 198/716, 728, 734, 735; 414/217; 406/77, 78, 82, 81; 162/17, 19, 246

[56] References Cited

U.S. PATENT DOCUMENTS

| | | | |
|---|---|---|---|
| 2,684,157 | 7/1954 | Tolman | 210/159 |
| 3,135,651 | 6/1964 | Starrett | 162/17 X |
| 3,191,758 | 6/1965 | Adams | 198/735 X |
| 3,258,390 | 6/1966 | Tomlinson | 162/17 |
| 3,950,146 | 4/1976 | Funk | 48/69 |
| 3,950,147 | 4/1976 | Funk et al. | 48/86 R |
| 4,017,270 | 4/1977 | Funk et al. | 48/197 R |
| 4,125,384 | 11/1978 | Funk | 48/86 R |

FOREIGN PATENT DOCUMENTS 202668  8/1923  United Kingdom ........... 198/735

Primary Examiner—James L. Rowland
Attorney, Agent, or Firm—Cushman, Darby & Cushman

[57] ABSTRACT

An improved lifting mechanism for an apparatus for continuously feeding solid particles into a pressure vessel of the type disclosed in U.S. Pat. No. 4,125,384, the lifting mechanism comprising an elongated cylindrical housing assembly operatively disposed with its axis extending at an angle to the horizontal and to the vertical. The housing assembly includes end structures closing the upper and lower ends thereof, a water and particle inlet for pressure communication with the pressure vessel of the apparatus leading downwardly into the interior of the housing assembly adjacent the closed lower end thereof and a particle outlet for pressure communication with the container of the apparatus leading downwardly from the interior of the housing assembly adjacent the closed upper end thereof. A particle supporting plate extends longitudinally within the cylindrical housing assembly between the end portions thereof and is fixedly mounted along the sides thereof between horizontally spaced diametrically opposed portions of the housing assembly. A pair of parallel endless chains have upper operative flights which extend along opposite sides of the upper surface of the plate, lower parallel return flights and arcuate ends trained about sprockets carried by the housing assembly at the ends of the plate. A series of spaced perforated particle moving structures extend between the chains and are operable during the movement of the chains through their operative flight to move therewith over the upper surface of the plate and upwardly through the space thereover defined by the upper periphery of the housing assembly so that particles introduced into the lower portion of the space through the inlet are moved positively inwardly through the liquid free surface and then discharged through the outlet in a condition in which the liquid has been substantially drained therefrom.

16 Claims, 4 Drawing Figures

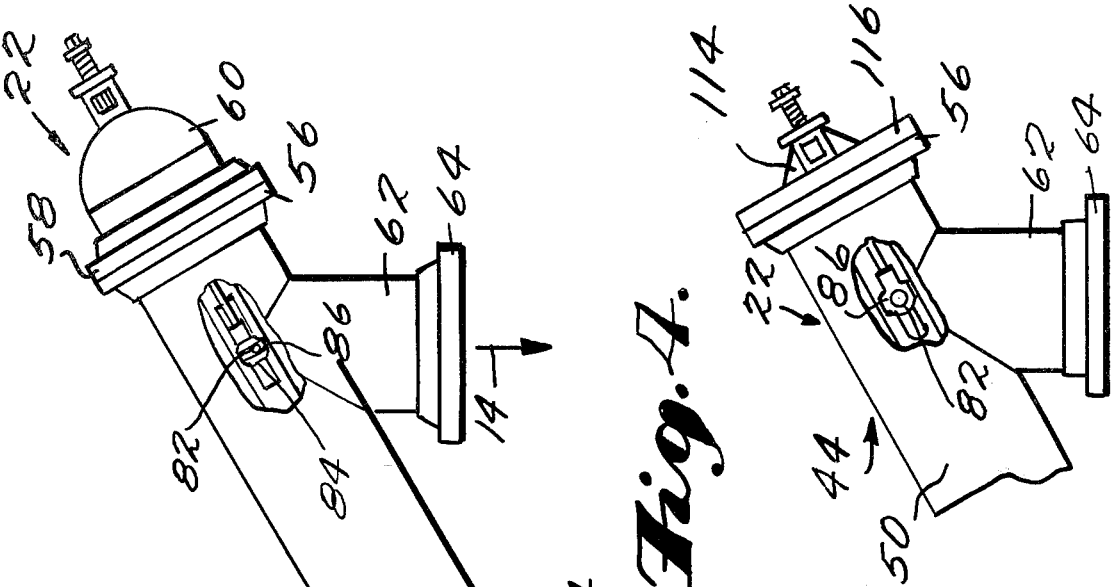
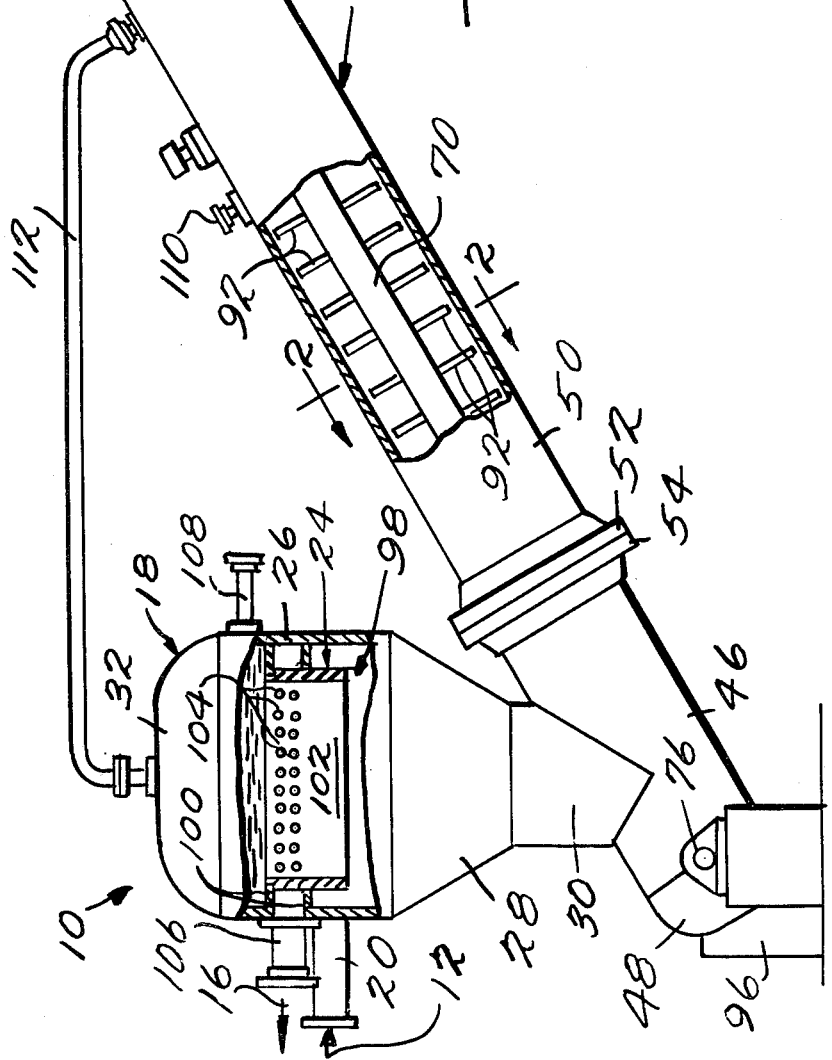

APPARATUS FOR CONTINUOUSLY FEEDING SOLID PARTICLES INTO A PRESSURIZED CONTAINER HAVING AN IMPROVED LIFTING MECHANISM

This invention relates to the feeding of solid particles into a pressure zone, and more particularly to improvements in apparatus for continuously feeding solid particles into a pressurized container of the type disclosed in commonly-assigned U.S. Pat. No. 4,125,384.

In U.S. Pat. No. 4,125,384, there is disclosed an apparatus which is particularly suited to feeding lump coal under pressure to a fixed bed type gasifier. The type of coal gasification apparatus to which the feeding assembly is applicable is described in commonly-assigned U.S. Pat. No. 4,017,270 (see also commonly-assigned U.S. Pat. No. 3,950,146). The feeding assembly of the patent, as well as the improvements of the present invention, also have applicability to feed systems of the type disclosed in commonly-assigned U.S. Pat. No. 3,950,147, as well as other solid particle feed systems for other types of pressure containers.

The apparatus of the patent includes a pressure vessel for containing a body of liquid having a free surface in communication with the pressure conditions of the gasifier vessel. The liquid utilized, preferably water, has a specific gravity less than the specific gravity of the solid particles such as coal which are to be separated and fed to the gasifier vessel under pressure. The feeding of the supply of solid particles entrained in liquid into the body of the liquid contained within the pressure vessel is through a tangential conduit so as to cause the solid particles to be evenly distributed to the lower portion of the body of liquid. A lifting mechanism is provided in communication with the bottom portion of the pressure vessel so as to move the solid particles upwardly from the bottom portion of the liquid body along a confined path above the free surface into a feed position from which the particles can enter the gasifier vessel through a feed pipe. The liquid withdrawal arrangement is communicated with the liquid body at or near the free surface where there are virtually no particles other than fines entrained in the liquid. In this way it becomes readily possible to arrange for uniform withdrawal of liquid without the necessity of providing restrictions to the flow of a size less than that which will allow free passage of the fines. The apparatus of the patent is advantageous in that the separation and feeding of the solid particles is accomplished without those particles or those of smaller size ever coming into screening relation to a screening surface which could become clogged.

The lifting mechanism disclosed in the patent embodies a helical blade mechanism. While such a mechanism has proven satisfactory in operation, one disadvantage inherent in the utilization of a helical blade mechanism is that the lifting mechanism is not positive acting. This lack of positive action is particularly noticeable when a small number of particles is presented to be lifted by the helical blade. To render the action more positive, the housing within which the helical blade rotor moves is provided with a plurality of longitudinal extending anti-rotation bars. Nevertheless, the arrangement is such that it is desirable to provide a lifting mechanism which has a more positive action.

It is an object of the present invention to fullfil the above-described desire. In accordance with the principles of the present invention, this objective is obtained by providing an improved lifting mechanism which includes an elongated cylindrical housing assembly operatively disposed with its axis extending at an angle to the horizontal and to the vertical between the vessel and container. The housing assembly includes end structures closing the upper and lower ends thereof, a water particle inlet in pressure communicating relation with the vessel leading downwardly into the interior of the housing assembly adjacent the closed lower end thereof and a particle outlet in pressure communicating relation with the container leading downwardly from the interior of the housing assembly adjacent the closed upper end thereof. A particle supporting plate extends longitudinally within the cylindrical housing assembly between the end portions thereof and is fixedly mounted along its sides between horizontally spaced diametrically opposed portions of said housing assembly. A pair of parallel endless chains having upper operative flights extending along opposite sides of an upwardly facing surface of the plate, lower parallel return flights and arcuate ends trained about sprockets carried by the housing assembly at the ends of the plate. A series of spaced perforated particle moving structures extend between the chains through their operative flight to move therewith over the upper surface of the plate and upwardly through the space thereover defined by the upper periphery of the housing assembly so that particles introduced into the lower portion of the space through the inlet are moved positively upwardly through the liquid free surface and then discharged through the outlet in a condition in which the liquid has been substantially drained therefrom.

It is a further object of the present invention to provide a lifting mechanism of the type described which is simple in construction, effective in operation and economical to manufacture and maintain.

These and other objects of the present invention will become more apparent during the course of the following detailed description and appended claims.

The invention may best be understood with reference to the accompanying drawings wherein an illustrative embodiment is shown.

In the drawings:

FIG. 1 is a side elevational view with parts broken away of an apparatus embodying the principles of the present invention;

FIG. 4 is a fragmentary side elevational view showing a modification of the apparatus illustrated in FIG. 1.

Figure 2:
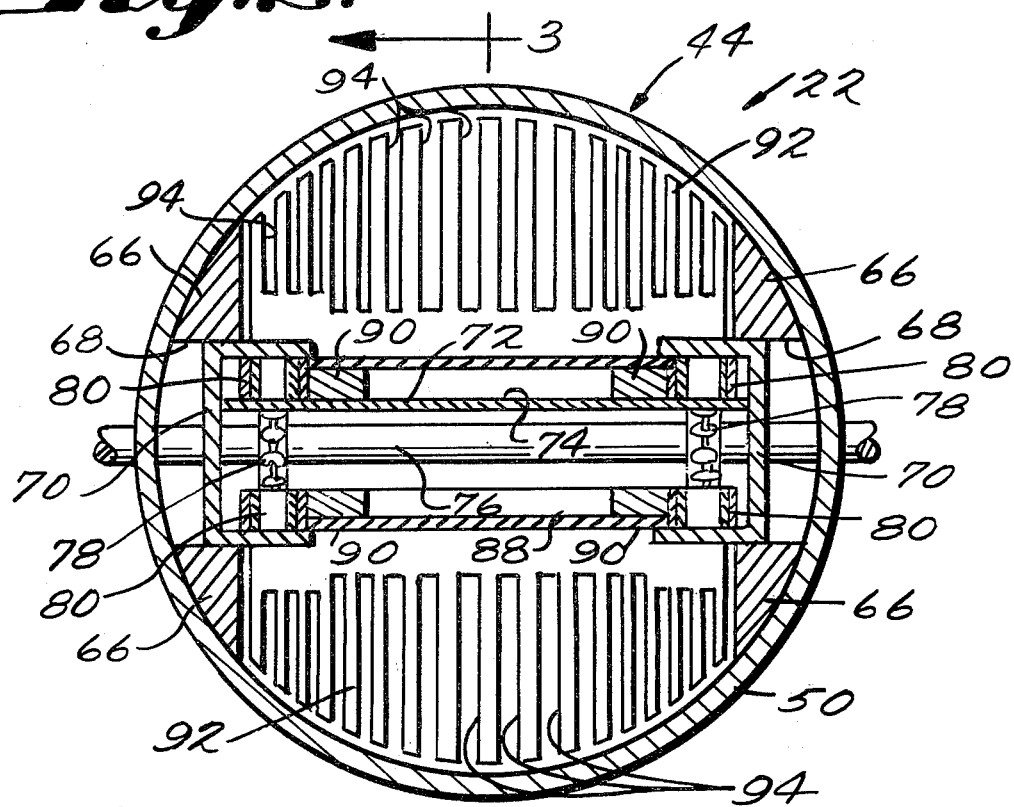
FIG. 2 is an enlarged sectional view taken along the line 2—2 of FIG. 1.
Figure 3:
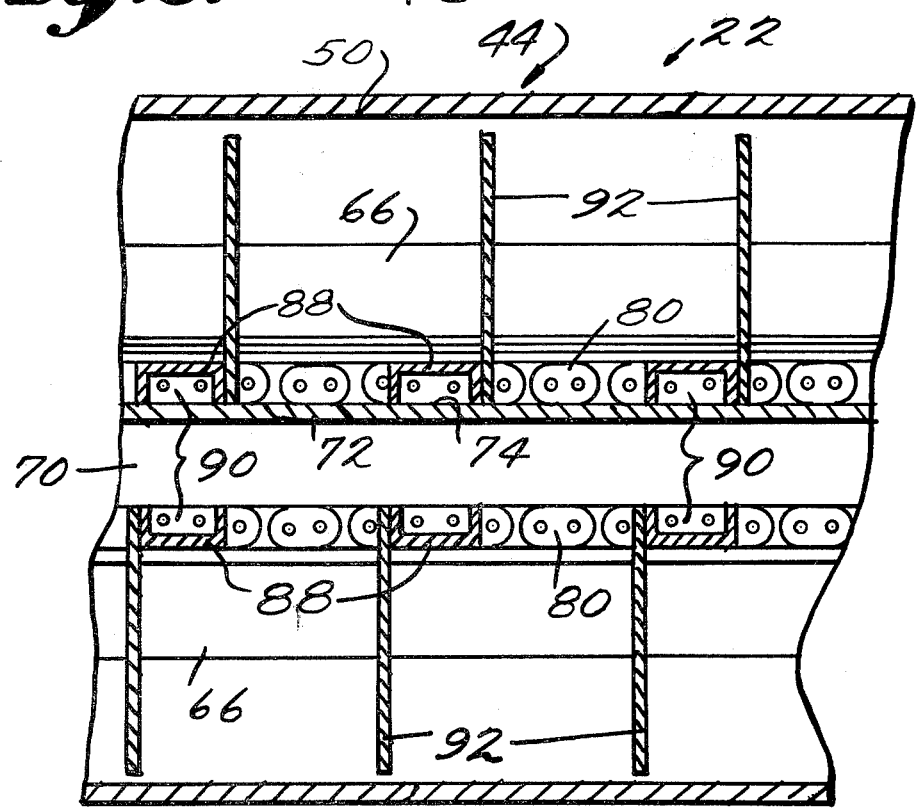
FIG. 3 is an enlarged fragmentary sectional view taken along the line 3—3 of FIG. 2.

Referring now more particularly to FIG. 1 of the drawings, there is shown therein an apparatus, generally indicated at 10, which embodies the principles of the present invention. The apparatus is of the type disclosed in the aforesaid U.S. Pat. No. 4,125,384 and is particularly suited to be utilized in a feed system of the type disclosed in the aforesaid U.S. Pat. No. 4,017,270, the disclosures of both of which are hereby incorporated by reference into the present application for purposes of background.

For present purposes, it is sufficient to note that the apparatus 10 is adapted to receive a continuous supply of solid particles, such as coal, within a size range of from approximately ¼ inch nominal diameter to approximately 2 inches nominal diameter entrained in liquid.

The liquid is preferably water, although other liquids may be utilized if desired, so long as the liquid has a specific gravity less than the specific gravity of the particles.

The slurry supply is fed to the apparatus 10 under pressure continuously as indicated by the arrow 12. The apparatus is adapted to feed solid particles having the main body of entraining liquid separated therefrom to a gasifier vessel continuously as indicated by the arrow 14. In order to maintain the input and output of the apparatus 10 substantially equal so that it can be operated continuously, a flow of separated liquid continuously is withdrawn from the apparatus, as indicated by the arrow 16.

The apparatus 10 comprises a pressure vessel, generally indicated at 18, adapted to contain a body of liquid therein having a free surface disposed in communicating relation with the pressure conditions within the gasifier vessel which is fed by the apparatus 10 or other pressurized container (not shown). The particle and entraining liquid supply 12 is introduced into the body of liquid contained within the vessel 18 via tangential feed conduit 20. The particles thus continuously introduced into the body of liquid are evenly distributed into the body of liquid and tend to move downwardly toward the lower portion of the body of liquid. The apparatus 10 includes an improved mechanical particle lifting mechanism, generally indicated at 22, which serves to move the particles in the lower portion of the body of liquid upwardly through a confined path above the free surface of the body of liquid to a feed position from which the particles can be moved into the pressure container as indicated by the arrow 14. As the particles are moved upwardly above the free surface, the entrained liquid therein is allowed to drain downwardly into the body of liquid so that as the particles reach the feed position and are moved into the pressurized container, as indicated by the arrow 14, substantially the only liquid retained with the particles is that amount which is retained by surface adherence. Finally, the apparatus 10 includes a system, generally indicated at 24, for withdrawing liquid from the body of liquid at a level at or near the free surface thereof in an amount so related to the amount of particles and entrained liquid introduced thereto and particles removed thereby along the aforesaid path as to be sufficient to maintain the free surface at a substantially constant level and along a liquid withdrawal flow path arrangement which is devoid of restrictions of a size less than that necessary to permit free passage thereby of any fine particles entrained in the withdrawn liquid.

The pressure vessel 18 may be of any suitable construction and, as shown, consists of a peripheral wall arcuate about a generally vertically extending axis formed by a multiplicity of metallic annular sections welded together. The vessel includes an upper cylindrical section 26 which carries the tangential inlet conduit 20, the conduit communicating tangentially to the interior of the cylindrical section 26. Extending below the cylindrical section 26 is a frustoconical lower section 28, the section diverging downwardly at an inclination of approximately 60° and having its lower end fixed to a lower cylindrical section 30. Fixed to the upper edge of the upper cylindrical section 26 is a dome section 32.

The improved lifting mechanism 22 of the present invention preferably includes a cylindrical housing assembly, generally indicated at 44, which is fixed at its lower end with the lower end of the lower cylindrical section 30 of the vessel 18. The cylindrical housing assembly 44 extends upwardly at an angle to the exterior of the vessel 18 with its axis disposed generally at an angle of approximately 60° with respect to the axis of the vessel 18. As the housing assembly 44 includes a lower section 46 the upper central portion of which includes an inlet fixed to and communicated with the lower end of the lower cylindrical section 30 of the pressure vessel 18. The lower end of the section 46 is closed by a hemispherical end wall structure 48. The cylindrical housing assembly section 44 also includes a main central section 50 having a flange 52 at the lower end thereof which engages and is secured to a mating flange 54 on the upper end of the lower section 46. The opposite end of the main section 50 has a connecting flange 56 thereon which engages a mating flange 58 of a dome-shaped end structure 60. At a position just below the flange 56 on the bottom side of the main section 50 a discharge section 62 defining an outlet is provided, the lower end of the section 62 having an attaching flange 64 thereon which serves to mount the same in pressure communicating relation with the upper end of the coal gasifying vessel (not shown).

Mounted within the housing assembly 44 is a series of support members 66. The support members are of generally triangular configuration in cross-section with the hypotenuse side of the triangular configuration being of a convexly curved arcuate shape so as to engage the interior peripheral surface of the cylindrical sections 46 and 50. As best shown in FIG. 2, the support members are arranged within the cylindrical housing assembly at each side so as to be disposed in equally spaced relation above and below a plane passing through the axis of the cylindrical housing which is perpendicular to a plane common to the axis of the vessel 18 and of the housing assembly 44. The arrangement is such that the associated pairs of support members at each side of the housing define opposed openings or grooves 68. Fixedly mounted within the grooves 68 is a pair of channel members 70, disposed so that their corresponding leg portions extend toward one another. A particle supporting plate 72 extends between the channel members 70. The plate 72 has opposed longitudinal edges thereof fixedly secured to the associated bight portions of the channel member 70 as by welding or the like. Plate 72 provides a particle supporting surface 74 which faces upwardly. The lower end of the plate terminates at a position substantially in alignment with the hemispherical end structure 48.

As best shown in FIG. 2, extending between the bight portions of the channel members 70 at a position adjacent the lower end of the plate 72 is a shaft 76, the ends of which extend exteriorly of the adjacent housing sections 46 and 48. Secured to the shaft within each channel member 70 is a sprocket wheel 78. A chain 80 is trained about each sprocket wheel 78 and a cooperating upper sprocket wheel 82 fixed to a shaft 84 adjustably carried by a take-up mechanism 86 at a position adjacent the upper end of the plate 72 in the main housing section 50. It will be noted that the upper flight of each chain is confined to move between the upper surface 74 of the particle supporting plate 72 and the lower surface of the upper leg portion of the channel members 70. Likewise, the lower flight of each endless chain 80 is supported for movement along the upper surface of the lower leg portion of the associated channel member 70.

Extending between spaced links of the chains 80 is a series of spaced flight bars 88. As best shown in FIGS.

2 and 3, the flight bars are preferably of channel shaped configuration, the ends of which are connected with mounting blocks 90 which serve to connect the same to the associated chain link. Fixed to one leg portion of each flight bar 88 is a perforated particle engaging plate member 92. As shown, each plate member 92 is of an outline configuration which corresponds generally with the outline configuration of the space above the particle supporting surface 74 and the associated upper surfaces of the upper leg portions of the channel members 70, the opposed flight surfaces of the associated support members 66, and the downwardly facing upper arcuate peripheral surface of the housing sections 46 and 50. In addition, the main portion of each plate member 92 adjacent the arcuate periphery is formed with a series of parallel slots 94 which define the perforations and permit the passage of liquid therethrough. The slots 94 thus provide a straining or sieving action for the plates 92 which permits water to pass therethrough but enables the plate members to contact and move particles within the liquid and above.

It will be understood that any suitable means may be provided for effecting the continuous movement of the chains 80. As shown, such means includes a variable speed electric motor 96 shown schematically in FIG. 1 suitably fixed in driving relation to the lower shaft 76.

The liquid withdrawal system 24 includes a manifold structure 98 which is mounted in cooperating relation around the interior of the upper cylindrical vessel section 26 at a position above the tangential inlet conduit 20. The manifold structure 98 is formed by a pair of longitudinally spaced ring-shaped walls 100 fixed to the interior of the cylindrical section 26 and an inner cylindrical wall 102 interconnecting the inner edges of ring-shaped walls 100 and extending downwardly therebelow in coextensive relation with the inlet conduit 20. Formed in the cylindrical wall 102 at or near the free surface of the body of liquid within the container 18 and at a level between the ring-shaped plates 100 is a multiplicity of openings 104. These openings serve to communicate the upper portion of the liquid body within the manifold 98 so that there will be an even distribution of the liquid into the manifold at a sufficiently low velocity through each of the holes such that there is very little tendency for the flow to cause entrainment of large particles. From the manifold arrangement 98 there is provided an exit pipe 106 through which the return liquid passes, as indicated by the flow arrow 16. In order to prevent the free surface from rising above a predetermined level in the vessel 18 there is provided an overflow pipe 108.

In operation, a slurry consisting of solid particles, such as coal, within the size range of from approximately ¼" nominal diameter to approximately 2" nominal diameter entrained in a liquid of a lesser specific gravity than the solid particles, preferably water, enters the vessel 18 at the point indicated by the arrow 12. The tangential disposition of the inlet causes the solid particles of the slurry to be evenly distributed as they move downwardly in the settling tank or vessel 18. A free surface of liquid is maintained in pressure vessel 18 by the liquid now separated from the solid particles flowing out of vessel 18 through the openings 104 in cylindrical wall 102. The openings 104 are sized and arranged to allow an even flow of liquid out of pressure vessel 18 around the entire periphery of the cylindrical wall 102. The liquid is collected in internal header 98 and flows out of outlet conduit 106 to the return line (not shown). The pressure vessel or settling tank 18 diameter and the cylindrical wall 102 diameter are such that the upward velocity of the liquid flow will not carry any solid particles larger than will easily flow through the openings 104 in cylindrical wall 102. The solid particles move downwardly to the lifting mechanism 22.

The solid particles settle through the inlet of housing assembly 44 on the plate 72 of the lifting mechanism 22. The drag bars 88 and drag plates 92 move upwardly along the surface 74 of the plate 72 collecting the solid particles and moving the solid particles upwardly. The drag bars 88 and drag plates 92 carry the solid particles upwardly through the free surface of the liquid toward the outlet conduit 62. After the solid particles pass through the free surface of the liquid, the liquid that filled the space between the solid particles drains back into the liquid body. The only liquid carried with the solid particles to the outlet conduit 62 is that which adheres to the surface of the solid particles.

The improved lifting mechanism 22 will carry from one solid particle to its maximum capacity, that is to say it is a positive acting device. There is no minimum capacity. Also the speed of the drag bars 88 can be adjusted by varying the speed of motor 96 to allow for more time for the liquid to drain from the spaces between the solid particles. There is no minimum speed below which the lifting mechanism will not function. The solid particles slide along the surface 74 of plate 72 which is not a pressure sustaining member of the apparatus as they move upwardly.

A method to remove the fine solid particles from the return line (not shown) can be included, with the fine particles being injected into the apparatus through fines inlet conduit 110 which is above the free liquid level. This allows all the solid particles to be separated from the liquid flow and fed into the gasifier vessel. Moreover, a pressure equalizing pipe 112 may be connected between the vessel 18 and housing 44 above the free surface of the liquid to facilitate communication of the gasifier gas pressure to the pressure vessel 18.

In FIG. 4 there is shown a variation in the construction of the upper end structure of the housing assembly 44 of the improved lifting mechanism. This Figure shows a flat end structure 114 having a flange 116 securely engaged with the flange 56 of the main housing section 50.

It will thus be seen that the objects of this invention have been fully and effectively accomplished. It will be realized, however, that the foregoing preferred specific embodiment has been shown and described for the purpose of illustrating the functional and structural principles of this invention and is subject to change without departure from such principles. Therefore, this invention includes all modifications encompassed within the spirit and scope of the following claims.

What is claimed is:

1. Apparatus for continuously feeding solid particles into a pressurized container comprising;
    a vessel for confining a body of liquid having a specific gravity less than the specific gravity of said particles in proximity to the pressurized container,
    means for maintaining communication of the pressure conditions within said pressurized container with a free surface of the confined body of liquid so as to maintain said body of liquid under pressure,
    means for continuously introducing a supply of solid particles entrained in liquid under pressure into the body of liquid under pressure so that the entrained particles will move continuously toward the bottom portion of said body of liquid, mechanical means for continuously moving the particles in the bottom portion of said body of liquid upwardly along a non-foraminous confined path which extends from a position adjacent the bottom portion of the body of liquid upwardly above the level of the aforesaid free surface thereof to a feed position in pressure communication with the interior of the pressurized container from which the particles can be fed into the pressurized container so that the entraining liquid filling the spaces between the solid particles being moved upwardly will drain from the particles downwardly into the body of liquid during the aforesaid movement of the particles above the free surface of the body of liquid whereby substantially the only liquid retained with said particles as they pass from said feed position and into said pressurized container is that amount which is retained by surface adherence, and means for continuously withdrawing liquid from said body of liquid at a level at or near the free surface thereof in an amount so related to the amount of particles and entrained liquid introduced thereto and particles removed thereby along said path sufficient to maintain said free surface at a substantially constant level and along a liquid withdrawal flow path arrangement devoid of restrictions of a size less than that necessary to permit free passage thereby of any fine particles entrained in the withdrawn liquid, the improvement comprising said mechanical means including an elongated cylindrical housing assembly operatively disposed with its axis extending at an angle to the horizontal and to the vertical, said housing assembly including end structures closing the upper and lower ends thereof, water and particle inlet means for pressure communication with the vessel leading downwardly into the interior of said housing assembly adjacent the closed lower end thereof and particle outlet means for pressure communication with the container leading downwardly from the interior of said housing assembly adjacent the closed upper end thereof, a particle supporting plate extending longitudinally within said cylindrical housing assembly between the end portions thereof, means for fixedly mounting the sides of said plate between horizontally spaced diametrically opposed portions of said housing assembly, said plate having an upwardly facing surface spaced above the axis of said housing assembly in parallel relation thereto, a pair of parallel endless chains having upper operative flights extending along opposite sides of the upper surface of said plate, lower parallel return flights and arcuate ends trained about sprockets carried by said housing assembly at the ends of said plate, and a series of spaced perforated particle moving structures extending between said chains operable during the movement of said chains through said operative flight to move therewith over the upper surface of said plate and upwardly through the space thereover defined by the upper periphery of said housing assembly so that particles introduced into the lower portion of the space through said inlet means are moved positively upwardly through the liquid free surface and then discharged through said outlet means in a condition in which the liquid has been substantially drained therefrom.

2. The improvement as defined in claim 1 wherein said mounting means includes a pair of channel members each having a bight portion and a pair of leg portions, said pair of channel members being fixed within said housing assembly with their bight portion in parallel relation and with corresponding leg portions extending toward one another, said plate having its side edges fixed to the bight portions of said channel members and said chains being disposed with the operative flights thereof below the upper leg portions and the return flights thereof above the lower leg portions.

3. The improvement as defined in claim 2 wherein said mounting means further includes upper and lower support members fixed to the interior periphery of said housing assembly and to the upper and lower leg portions respectively of each channel member.

4. The improvement as defined in claim 1, 2 or 3 wherein each of said perforated structures includes a transverse bar connected to said chains and extending therebetween and a perforated plate fixed to said bar, said perforated plate having an arcuate periphery disposed in closely adjacent relation with respect to the arcuate interior periphery of said housing assembly during movement thereof through said operative and return flights.

5. The improvement as defined in claim 4 wherein each of said perforated plates has a series of elongated parallel slots extending from the arcuate periphery thereof which define the perforations thereof.

6. The improvement as defined in claim 1 wherein said lower end structure is hemispherical.

7. The improvement as defined in claim 1, 2 or 3 wherein said upper end structure is hemispherical.

8. The improvement as defined in claim 1, 2 or 3 wherein said upper end structure is flat.

9. A lifting mechanism for use between a feed vessel and a pressurized container for moving particles in a body of liquid in the vessel having a free surface in pressure communicating relation with the pressure conditions of the container from the bottom portion of the body of liquid upwardly through the level of the free surface and into the container, said lifting mechanism comprising an elongated cylindrical housing assembly operatively disposed with its axis extending at an angle to the horizontal and to the vertical, said housing assembly including end structures closing the upper and lower ends thereof, water and particle inlet means for pressure communication with the vessel leading downwardly into the interior of said housing assembly adjacent the closed lower end thereof and particle outlet means for pressure communication with the container leading downwardly from the interior of said housing assembly adjacent the closed upper end thereof, a particle supporting plate extending longitudinally within said cylindrical housing assembly between the end portions thereof, means for fixedly mounting the sides of said plate between horizontally spaced diametrically opposed portions of said housing assembly, said plate having an upwardly facing surface spaced above the axis of said housing assembly in parallel relation thereto, a pair of parallel endless chains having upper operative flights extending along opposite sides of the upper surface of said plate, lower parallel return flights and arcuate ends trained about sprockets carried by said housing assembly at the ends of said plate, and a series of spaced perforated particle moving structures extending between said chains operable during the movement of said chains through said operative flight to move therewith over the upper surface of said plate and upwardly through the space thereover defined by the upper periphery of said housing assembly so that particles introduced into the lower portion of the space through said inlet means are moved positively upwardly through the liquid free surface and then discharged through said outlet means in a condition in which the liquid has been substantially drained therefrom.

10. A lifting mechanism as defined in claim 9 wherein said mounting means includes a pair of channel members each having a bight portion and a pair of leg portions, said pair of channel members being fixed within said housing assembly with their bight portion in parallel relation and with corresponding leg portions extending toward one another, said plate having its side edges fixed to the bight portions of said channel members and said chains being disposed with the operative flights thereof below the upper leg portions and the return flights thereof above the lower leg portions.

11. A lifting mechanism as defined in claim 10 wherein said mounting means further includes upper and lower support members fixed to the interior periphery of said housing assembly and to the upper and lower leg portions respectively of each channel member.

12. A lifting mechanism as defined in claim 9, 10 or 11 wherein each of said perforated structures includes a transverse bar connected to said chains and extending therebetween and a perforated plate fixed to said bar, said perforated plate having an arcuate periphery disposed in closely adjacent relation with respect to the arcuate interior periphery of said housing assembly during movement thereof through said operative and return flights.

13. A lifting mechanism as defined in claim 12 wherein each of said perforated plates has a series of elongated parallel slots extending from the arcuate periphery thereof which defines the perforations thereof.

14. A lifting mechanism as defined in claim 9 wherein said lower end structure is hemispherical.

15. A lifting mechanism as defined in claim 9, 10 or 11 wherein said upper end structure is hemispherical.

16. A lifting mechanism as defined in claim 9, 10 or 11 wherein said upper end structure is flat.

* * * * *